(No Model.)
E. A. SPERRY.
ELECTRIC CAR BRAKE.
No. 360,060. Patented Mar. 29, 1887.
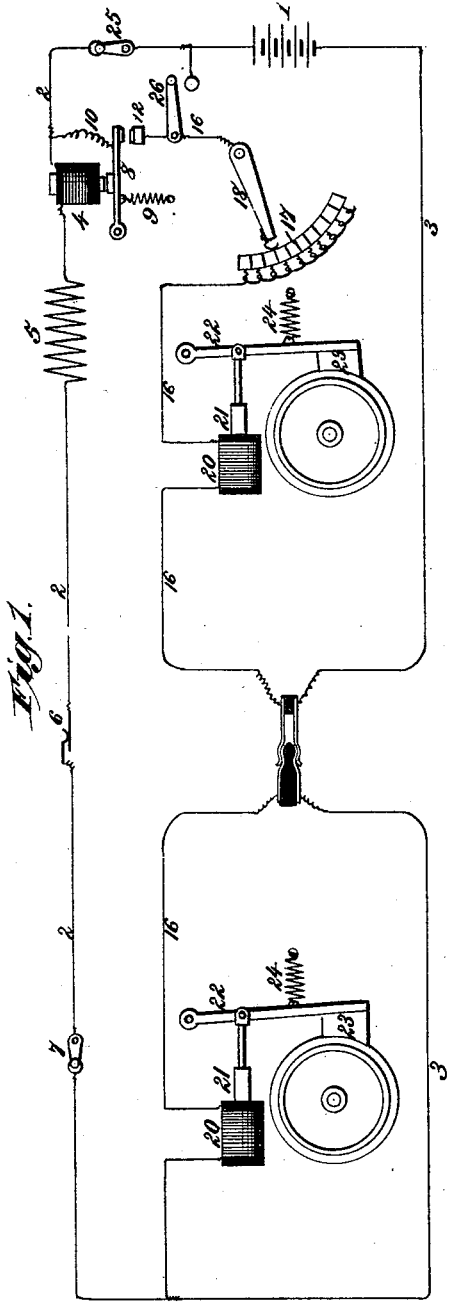
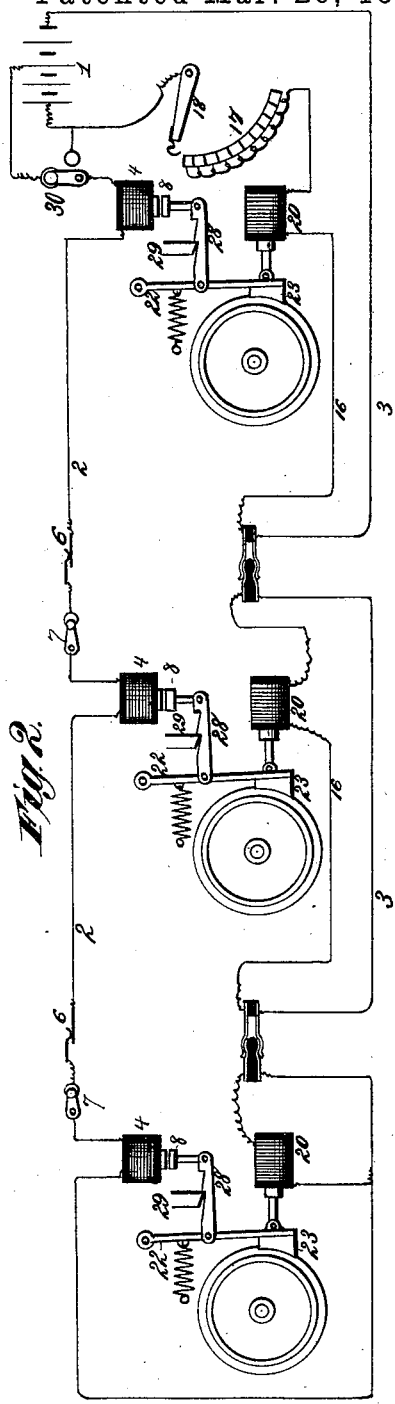
Witnesses.
Robert Emmett
Vinton Coombe
Inventor:
Elmer A. Sperry,
By James L. Norris.
Atty.

UNITED STATES PATENT OFFICE.

ELMER A. SPERRY, OF CHICAGO, ILLINOIS.

ELECTRIC CAR-BRAKE.

SPECIFICATION forming part of Letters Patent No. 360,060, dated March 29, 1887.

Application filed June 3, 1886. Serial No. 204,031. (No model.)

*To all whom it may concern:*

Be it known that I, ELMER A. SPERRY, a citizen of the United States, residing at Chicago, in the county of Cook and State of Illinois, have invented new and useful Improvements in Electric Car-Brakes, of which the following is a specification.

The present invention relates to a system of brake-operating devices for railroad-cars; and it consists, essentially, in the employment of two electric circuits, one of which is normally open and controls the operation of the brakes, while the other circuit is normally closed and controls the operation of the translating devices in the open circuit.

The invention will first be fully described in connection with the accompanying drawings, and then fully set forth in the claims.

In said drawings, Figure 1 is a diagram view of an electric-brake system in which the solenoid-magnets are used for applying the brake-shoes to the wheels. Fig. 2 is another diagram view, in which the brakes are mechanically applied and electrical devices are employed to hold the brakes out of action and regulate the degree of pressure on the wheels.

The reference-numeral 1 designates an electric battery or other source of electricity, which is located upon the engineer's cab or advance car of a train. Wires 2 3, extending from the opposite poles of said battery, extend throughout the entire length of the train and form a closed electric circuit. This closed circuit contains an electro-magnet, 4, and an ordinary resistance, 5, and at points between each car separable contact-plates 6 are provided to make and break contact when the cars are either coupled or separated. On each car, or other points along the closed circuit, are arranged manual switches 7, for breaking the closed circuit at the times and for the object hereinafter stated. An armature-lever, 8, arranged in co-operative relation to the electro-magnet 4, is attracted by said magnet when the circuit formed by the wires 2 3 is closed. As shown in Fig. 1, this armature is attached to a retracting-spring, 9, and a flexible wire, 10, serves to connect it with the wire 2. When no current is passing through the magnet 4, the armature rests upon a stop, 12, and in such event the normally-closed circuit is broken, and the flow of current then takes place through a circuit formed by the wire 16 and the wire 3. The circuit formed by the wires contains an adjustable rheostat, 17, the lever 18 of which is connected with a wire extending from the stop 12. The wire 16 extends throughout the entire train, and at points between the cars it is united with the wire 3 by interlocking coupling heads or devices, so as to preserve the continuity of the circuit. The wire 16 is on each car connected with the helix of an electro-magnet, 20, and the latter has a sliding core, 21, which is connected with a lever, 22, bearing a brake-shoe, 23. A strong spring, 24, attached to the lever 22 and frame-work of the car, serves normally to hold the brake-shoe away from the wheel or friction-disk on the car-axle. When it is desired to apply the brakes, the normally-closed circuit is broken by the switch device on the cars; or the engineer may accomplish a like result by moving the switch 25 to break the closed circuit and changing the switch 26, which is located in the normally-open circuit. When the current flows through the circuit formed by the wires 16 and 3, the electro-magnets located therein are energized and their cores are moved longitudinally, thereby overcoming the pressure of the springs and applying the brakes by the direct action of the electric current.

The object of the adjustable rheostat 17 is to provide means for varying the intensity of the current sent to the brake-operating circuit, in order to apply the brakes with more or less pressure and enable the train to be stopped within any required distance. In the system shown in Fig. 2 the normally-closed circuit serves to hold the brakes out of action through the intervention of a mechanical locking device consisting of the ratchet-bar 28 and the fixed pawl 29 on the car. The bar 28 is connected with the armature 8, and when the latter is attracted by the magnet the stop-pawl holds said bar 28 and prevents the brakes from being applied.

In the arrangement seen in Fig. 2 only a weak current is required to energize the electro-magnet that attracts the armature connected with the aforesaid mechanical locking device. I therefore divide the battery into sections, as shown, and take the current for the normally-closed circuit from one of said sections, as shown. When the normally-closed circuit is broken, the magnets arranged therein are demagnetized, and the current then flows through the other circuit, which includes the adjustable rheostat.

It is apparent that the switch-arm 18 and the rheostat 17 serve to close the normally-opened circuit when said switch-arm (shown removed from the rheostat in Fig. 2) is moved to make contact with the rheostat.

It is apparent that by the demagnetizing of the magnets in the normally-closed circuit the bars 28 are released from the pawls 29, and thereupon the springs connected with the brake-bars force the brake-shoes upon the wheels.

The degree of application of the brakes is regulated by the counter pull of the solenoid-magnets upon the brake-shoes, and it is apparent that the intensity of the current sent into the controlling-circuit is regulated by the adjustable rheostats.

It will be understood that the full battery force can be sent to the brake controlling and releasing circuit by a suitably-disposed switch, 30, and hence means are provided for operating the brakes from the engineer's stand or any point throughout the length of the train.

It will be seen that at the very moment any of the cars furnished with the system seen in Fig. 2 become disconnected the brakes are speedily applied.

I am aware that railway-brakes have been operated by the breaking or the closing of an electric circuit; but I do not know that my arrangement of normally closed and open circuits has heretofore been proposed.

What I claim as my invention is—

1. The combination, in an electric-brake system, of a normally-closed electric circuit, devices, substantially as set forth, for keeping the brakes out of action during the closed condition of said circuit, a normally-open circuit, and means for closing the latter to bring the brakes into action when the normally-closed circuit is broken, substantially as herein set forth.

2. The combination, in an electric brake system, of a normally-closed electric circuit containing electro-magnets, mechanical devices for holding the brakes out of action and applying the same, co-operating with said electro-magnets, and a second normally-open circuit, including electro-magnets and co-operating with the brake devices, and means for closing said circuit to control the movement of the mechanically-operated brakes, substantially as herein set forth.

In testimony whereof I have affixed my signature in presence of two witnesses.

ELMER A. SPERRY.

Witnesses:
HARRY T. JONES,
O. W. BOND.